US007979893B2

(12) United States Patent
Ontaneda et al.

(10) Patent No.: US 7,979,893 B2
(45) Date of Patent: Jul. 12, 2011

(54) TAILORED SYSTEM MANAGEMENT INTERFACE

(75) Inventors: Marisol Ontaneda, Redmond, WA (US); Thomas W. Keane, Seattle, WA (US); Baelson B. Duque, Redmond, WA (US); Chandika Bhandari, Redmond, WA (US); Travis Wright, Everett, WA (US); Vitaly Voloshin, Issaquah, WA (US); Casey McKinnon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 890 days.

(21) Appl. No.: 11/756,547

(22) Filed: May 31, 2007

(65) Prior Publication Data

US 2008/0301803 A1 Dec. 4, 2008

(51) Int. Cl.
*G06F 17/30* (2006.01)
(52) U.S. Cl. ..................................... 726/2; 726/6; 726/5
(58) Field of Classification Search .................. 726/2, 6, 726/5
See application file for complete search history.

(56) References Cited

U.S. PATENT DOCUMENTS

| | | | |
|---|---|---|---|
| 6,055,637 A | 4/2000 | Hudson et al. |
| 6,678,889 B1 | 1/2004 | Burkett et al. |
| 6,732,362 B1 | 5/2004 | Lee |
| 6,751,657 B1 | 6/2004 | Zothner |
| 6,779,016 B1 | 8/2004 | Aziz et al. |
| 7,086,006 B2 | 8/2006 | Subramanian et al. |
| 2002/0188869 A1 | 12/2002 | Patrick |
| 2002/0194297 A1 | 12/2002 | Jen et al. |
| 2003/0229888 A1 | 12/2003 | Spotswood et al. |
| 2004/0128358 A1 | 7/2004 | Apfel et al. |
| 2005/0071853 A1 | 3/2005 | Jones et al. |
| 2005/0198324 A1 | 9/2005 | Silva |
| 2005/0278656 A1 | 12/2005 | Goldthwaite et al. |
| 2006/0010423 A1 | 1/2006 | Haselden |
| 2006/0129983 A1 | 6/2006 | Feng |

OTHER PUBLICATIONS

System Center Operations Manager From Wikipedia, the free encyclopedia, printed out in year 2011.*
System Center Operations Manager 2007 R2, Microsoft, printed out in year 2011.*
System Center Essentials From Wikipedia, the free encyclopedia, printed out in year 2011.*
Coutaz "Software Architecture Modeling for User Interfaces", available at least as early as <<Jan. 9, 2007>>, at <<http://wwwciteseer.ist.psu.edu/cache/papers/cs/4072/ftp:zSzzSzftp.imag.frzSzpubzSzlIHMzSzpublicationszSz1992zSzEncyclopedia92_Architechture.pdf/coutaz93software.pdf>>, pp. 2-33.
Kern, et al., "An Administration Concept for the Enterprise Role Based Access Control Model" available at least as early as <<Jan. 9, 2007>>, at <<http://www.moffett.me.uk/jdm/pubs/AdminRBAC_SACMAT2003.pdf>>, ACM, 2003, pp. 9.
Puerta, "The MECANO Project: Comprehensive and Integrated Support for Model-Based Interface Development", available at least as early as <<Jan. 9, 2007>>, at <<http://www.isys.ucl.ac.be/bchi/cadui/96/files96/Puerta-CADUI96.pdf>>, pp. 20-36. Wang, "Team-and-Role-Based Organizational context and Access Control for Cooperative Hypermedia Environments" available at least as early as <<Jan. 9, 2007>>, at <<http://delivery.acm.org/10.1145/300000/294480/p37-wang.pdf?key1=294480& key2=0306238611 &coll=GUIDE&&dl=GUIDE& CFID=10907384 &CFTOKEN=65433364>>, ACM, 1999, pp. 37-46.
PCT Search Report for PCT Application No. PCT/US2008/064398, mailed Aug. 28, 2008 (12 pages).

* cited by examiner

*Primary Examiner* — David Y Jung
(74) *Attorney, Agent, or Firm* — Lee & Hayes, PLLC

(57) ABSTRACT

Processes and techniques for tailoring operations management in a system are described. The processes and techniques allow a user to customize operations management based on the user's function within a system and the particular tasks that the user wishes to accomplish. Simplified user interfaces can be created by scoping the interfaces based on user profiles, preferences and system components.

20 Claims, 9 Drawing Sheets

TAILORED SYSTEM MANAGEMENT INTERFACE

BACKGROUND

The proliferation of distributed and interconnected computing systems has introduced a level of complexity into the process of accomplishing most information technology (IT) tasks, such as configuration, monitoring, and operations. Historically, this has been handled by dividing the functions among IT professionals and providing them with different sets of tools which did not have to be aware of each other. However, the systems these professionals have to manage have become much more dynamic, introducing another level of complexity in that these professionals/tools need to be constantly aware of each other.

Typical managed systems include large numbers of types of managed entities and large numbers of individual management objects of these different types. This results in a level of information overload that causes many system activities become cumbersome. An interface associated with an IT user can become so cluttered as to make it difficult to accomplish many IT related tasks.

SUMMARY

This summary is provided to introduce operations management techniques and processes, which are further described below in the Detailed Description. This summary is not intended to identify essential features of the claimed subject matter, nor is it intended for use in determining the scope of the claimed subject matter.

This disclosure is directed to processes and techniques for tailoring operations management in a system. The processes and techniques allow a user to customize operations management based on the users function within a system and/or the particular tasks that the user wishes to accomplish. Customized user interfaces can be created by scoping the interfaces based on user profiles, preferences and/or system components.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
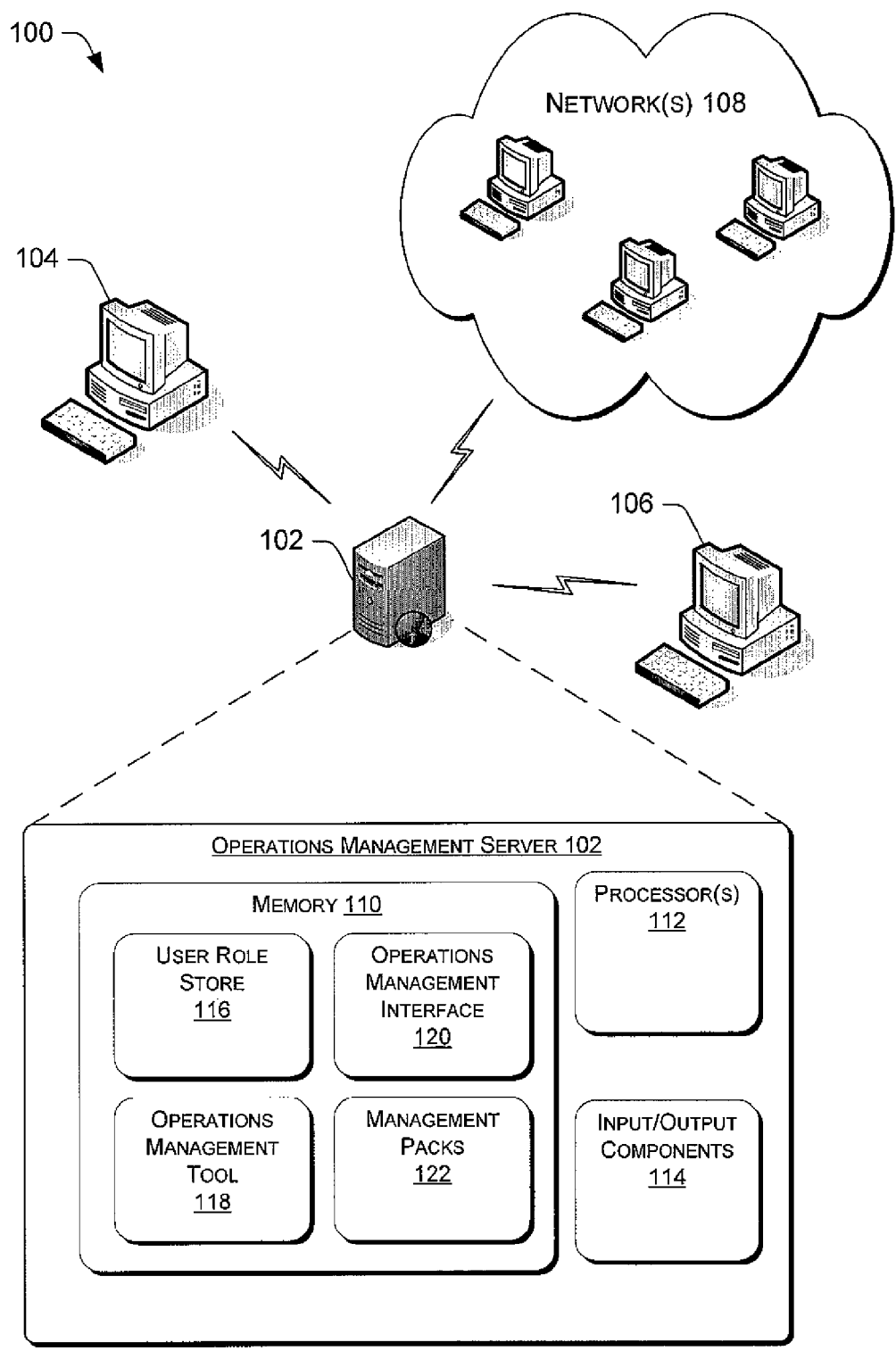
FIG. 1 illustrates an illustrative environment for implementing an operations management tool to manage a system.

Described herein are processes and techniques for flexible and scaleable model-based operations management solutions in distributed information environments. These solutions provide, for example, event-driven operations monitoring, capacity planning, performance tracking, security policy enforcement, and auditing capabilities.

Previous operations management solutions presented crowded user interfaces that often contained, along with the information desired by the user, information that the user did not need. This tended to overwhelm the user with too much information and thus decrease the ability of the user to perform his or her required tasks. The model-based techniques discussed herein provide a filtered and context sensitive user experience that can be tailored automatically and/or by the user, administrator and/or domain experts, as appropriate. As the users interact with the system, information that is not relevant based on the user's role, privileges, the task at hand and the object on which the task is being performed can be filtered out of the user's experience. This simplifies the user's experience and enables the user to better focus on his or her immediate tasks.

In various implementations, operations management solutions allow monitoring of multiple system components, such as hardware and software components. Illustrative hardware components include server devices, client devices and network devices that are interconnected by one or more communications networks. Although different examples of hardware devices are illustrated in the accompanying figures, this is not intended to be limiting, and the hardware devices may be implemented as any suitable computing device, including a desktop computer, a workstation, a mainframe computer, a mobile communication device, a portable digital assistant (PDA), an entertainment device, a set-top box, an Internet appliance, a game console, and so forth. Illustrative software components include operating systems, applications, drivers, databases, to name just a few.

Models Based Management

The concept of models-based management is introduced. Models break down individual managed devices into detailed levels of logical or physical components and they also service a complex web of relationships across this large number of components and across a complex network. Models also describe metadata relevant to the different IT roles and tasks attached to this web of managed objects, like policies, health, configuration, ownership, and the like. Models can include large groups of managed objects and can also be comprised of smaller groups of models.

In one example, a model is made up of types of managed objects, relationships between managed objects, and particular instances of managed objects. Generally stated, a type describes a class of system components that can contain one or more instances or objects. For example, the type "client" describes a type of computing devices that are part of a network, and one or more computing devices are instances of this particular type. Thus, in one example of a model, the model is represented hierarchically and starts at a general level of abstraction such as "logical entity" and then, in increasing levels of specificity, "computer", "client computer", "Brand X computer", and so on with respect to the particular aspects of the model.

Model-Based Group Creation

Using the model-based approach, groups of managed objects can be created. The use of groups in operations management allows for greater security and increased usability of the operations management console (i.e., the operations management user interface). Groups can be used to scope authorization, scope the data presented in the console views, subscribe to certain notifications (e.g., a user can limit a particular notification to a set group or groups) and to target operations management policies to particular groups.

A user can create a group that is dynamic, static, or both dynamic and static. A dynamic group has dynamic inclusion rules and/or exclusion rules that enable group members to be added or subtracted automatically. An example of a dynamic inclusion rule is "all disk drives manufactured by brand X." When this group is created, all disk drives manufactured by brand X are added to the group. If a disk drive manufactured by brand X is added to the system later, the disk drive will automatically be added to this group. Likewise, if a disk drive manufactured by brand X is later removed, this disk drive will be subtracted from the group. A dynamic exclusion rule can include specific managed objects in a group except those expressly excluded by the rule.

A static group is constructed using static inclusion rules and includes a particular set of managed objects. For example, a group can be created that includes computer A, computer B, and computer C. These computers make up the group until computers are explicitly added or subtracted from the group. A third type of group includes both dynamic and static inclusion rules, and can include objects that may be added or subtracted automatically based on the dynamic inclusion rules, as well as static objects that can be explicitly added or removed. Groups may also be homogenous or heterogeneous. A homogenous group includes similar objects (e.g., disk drives), whereas a heterogeneous group includes different objects (e.g., disk drives, monitors, and processors).

Groups can be created based on the properties of particular types that are defined in a model. For example, a dynamic inclusion rule can be created using the properties of a particular type in a particular model. The group can be automatically updated when instances of the particular type are added or subtracted to the operations management system. In a particular example, a user wants to create a group that includes all computers that have a hosting relationship to disk drives that are manufactured by brand X. Thus, the group would include a dynamic inclusion rule such as "include all computers wherein disk drive manufacturer=brand X." Based on this dynamic inclusion rule, managed objects can be added when new computers and/or disk drives are added to the system, and managed objects can be subtracted when computers and/or disk drives are removed from the system. Inclusion rules can utilize any suitable operator, such as "=", "<", ">", "contains", and so on.

Thus, as described, a group can be created based on any type and/or property of a model, and group membership can be dynamically updated based on the inclusion and/or exclusion rules. Further, group membership can be determined by related types and properties as defined by the model. For example, "include all databases where the host computer domain property=X".

User Roles

The described processes and techniques utilize user roles for purposes of security and to control the presentation of data in an operations management console. A user role refers to the particular duties and/or tasks that a type of user has. Thus, some users are defined as operators and may only have permission to view certain aspects of the system (e.g., managed objects and alerts) but cannot add or delete objects and/or other operations management parameters. Other users are authors, and have a set of permissions that permit the user to describe the types of objects the user wants to monitor and to create system management groups, attributes, monitors, and rules. These are presented for purposes of example only, and other user roles may be defined according to the needs of a particular system and/or system administrator.

With respect to security, user roles allow certain resources and functions (e.g., add and delete functions) to be "scoped" and thus reserved for users whose role provides the requisite permissions. Thus, a particular resource may be protected from an operator, whereas it may be revealed to an author. User roles also allow the operations management console to be scoped based on the user role. In one example, an operator only needs to see alerts or other problem indicators about managed objects or groups of managed objects. Thus, the operator's console would display the alerts and problem indicators that the operator needs to see without cluttering the interface with objects or tasks that the operator is not permitted to view.

In some implementations, the scoping based on user roles is driven by the particular models defined in the system. The groups and types available to particular users are determined by the particular model being utilized. Thus, if a particular model is modified, for example, by adding new types, the new types will automatically be scoped based on the particular user role. The user role scoping may also be hierarchical in that when a user is granted permission to access a group or a type, the user also is granted access to the objects that a group contains or the objects that derive from the particular type. For example, if a user is granted access to a specific computer, the user is automatically granted access to all aspects of the computer, such as its hardware, software, and the like. In other examples, however, overrides may be implemented that exclude certain permissions that are part of a type of group of managed objects.

Management Tasks

A task defines a particular procedure or set of procedures that execute in an operations management system to solve a specific problem or implement a required action. For example, a user may receive a notice that a particular system service (e.g., an email service) is not running correctly. The user could then initiate a task that would perform a procedure or set of procedures that are designed to restart the service. The task would be submitted to the computer on which the particular service is running, and the procedures that are a part of the task would be performed to restart the service. The result of the task could then be reported back to the user to inform the user as to the success or not of the task (i.e., whether or not the service successfully restarted).

The tasks in a particular system are driven by the model being utilized, and thus are extensible based on changes to the model and/or changes to objects or types that make up the model. Thus, a particular task is linked to particular types within a model, and type information is passed automatically to the task when the task is executed based on a context that a user has selected. In one example, a user may receive an alert that a certain system service (e.g., an antivirus engine) is not running. The user can initiate a "start service" task based on the alert without having to specify the particular service that the user wants to restart. The task is automatically aware of the service that must be restarted because the task is linked to the service based on the particular model being used. A particular task within a system is targeted at a particular type within a model, and thus the properties of the type are available as parameters to the task. In the above example, the "start service" task is targeted to the particular service and the service name property is passed to the task as a task parameter. For example, task parameters such as service identifiers and service locations could be passed from the service type to the task.

Tasks are also made available dynamically based on a selection that a user has made on an operations management console. For example, if a user selects a particular computer, tasks that relate to that computer will be made available to the user. In some examples, any tasks that are not relevant to the selected type or object will not be displayed on the console. Thus, the tasks displayed to the user are relevant to the model being viewed on the operations management console.

Tasks that are available to a user can also traverse relationships up and down a particular containment hierarchy within a model. For example, a particular task called "restart SQL server" may be targeted at a SQL (Structured Query Language) server. The SQL server is contained by a particular computer, and the SQL server contains a particular database. Each particular type (i.e., the "computer" type, the "SQL server" type, and the "database" type) has its own associated tasks. In this example, the computer type has a "restart computer" task, the SQL server has a "restart SQL server" task, and the database has a "backup database" task. When a user selects the SQL server on the operations management console, the user is presented with these related types and their related tasks. Thus, if the SQL server generates an error, the user has the option of backing up the database, restarting the SQL server, and restarting the computer. One or all of these tasks may be performed as appropriate. Since these types are related in this illustrative model, the tasks associated with the types will be presented to a user that views the types.

Parameter Substitution

Using the discussed model-based approach to systems management, when a user launches a particular task in a system (e.g., the "restart SQL server" task discussed above), any properties of the selected managed object or related objects can be passed as parameters to the task. Thus, the task is dynamically updated with the information necessary to carry out its particular procedures. A similar parameter substitution occurs when system monitors are instantiated. When a monitor is instantiated, the values necessary to implement the monitor are passed to the monitor based on the model being utilized. For example, in a particular model a user can define a type, a property for the type, and a discovery rule that allows objects to be discovered based on the type. Once these objects and property values are discovered, the property values can be dynamically passed as parameters to monitors, tasks or other system rules.

As an example, a user wants to create a monitor that tracks the free space on a particular set of disk drives. A specific type is defined as "disk drive", a property for the type is defined as "volume letter" (e.g., "C:" on a particular computer), and a discovery rule is created that discovers the volume letters for each disk drive in the set. When the type is defined and the type parameters (e.g., properties and discoveries) are determined, the properties are passed as parameters to the monitor. Using these parameters, the monitor can identify the disk drives in the set and track the memory usage based on a certain threshold.

Illustrative Operating Environment

FIG. 1 illustrates one illustrative operating environment 100 that can utilize the described processes and techniques. However, the processes and techniques described herein are more broadly applicable to any other network or other collection of computing devices. Operating environment 100 includes operations management server 102 that is configured to communicate with an operator console 104, a managed device 106, and a network 108. Together, these components make up one or more systems that can be managed using the described operations management processes and techniques. Operations management server 102 includes memory 110, processor(s) 112, and input/output components 114 (e.g., a mouse and keyboard). Memory 110 includes computer-readable media in the form of volatile memory, such as Random Access Memory (RAM) and/or non-volatile memory, such as Read Only Memory (ROM) or flash RAM. Although not expressly illustrated, operations management server 102 includes a system bus that connects the different components of the operations server.

As illustrated, network 108 includes multiple devices. Although the network is shown with three devices, this is not intended to be limiting, and the network may contain any suitable number and/or combination of devices. Network 108 can be any suitable communication network (wired, wireless, or otherwise), such as a Local Area Networks (LAN), Wide Area Network (WAN), Metropolitan Area Network (MAN), cellular network, satellite network, and/or cable network.

In one illustrative implementation, a user may wish to manage one or more aspects of operating environment 100. The user can have one or more roles in managing operating environment 100, such as an administrator, an author, or an operator, for example. The distinctions between these roles are discussed in more detail below. To access operations management server 102, the user logs on to operator console 104. Operator console 104 is a computing device that acts as an input, output and display interface with operations management server 102, and allows a user to observe and interact with the various components of a system that are managed by the operations server. Based on the user's logon information (e.g., user name and password), operations management server 102 can determine the user's role in the operations management environment. For example, operations management server 102 can compare the user's logon information with user roles that are stored in user role store 116. User role store 116 can index user information to allow operations management server 102 to determine scope and user permissions based on user identifiers, such as user logon information. The user then accesses an operations management tool 118, which is stored on memory 110. Operations management tool 118 may include one or more applications that implement one or more aspects of the operations management processes and techniques discussed herein.

When accessed, operations management tool 118 accesses operations management interface 120 and presents a graphical operations management interface to the user. Operations management interface 120 contains information about various components of the system(s) managed by operations management server 102. In one implementation, the operations management interface only includes the system information the particular user that has logged into the server is permitted to view. The system information that the user is permitted to view may be determined by the user's particular role in the operations management environment. For example, a system operator may have one set of permissions that allow the operator to view certain system components and/or certain aspects of the system components, while an author may have an additional and/or different set of permissions.

Operations management tool 118 may also load management packs 122 from memory 110. A management pack is a software module that contains rules to monitor, control, or otherwise manage one or more components of a system. In one example, management packs may be configured to monitor an array of system component health indicators, and to create an alert when a problem with a component is detected or an event occurs. Management packs may also include monitors and types that are derived from a particular model. A management pack can start with a particular model and create a new type based on the model. Discovery rules can then be added to this type. The discovery rules are used to discover objects based on a particular type. Rules, monitors, tasks, and views can also be related to the type defined in the management pack and added to the management pack. A management pack can also include knowledge articles, such as an article that tells an operator why a particular problem occurred and how the operator can fix the problem.

Individual management packs can be tailored for particular system components and system tasks. For example, a management pack associated with a web application may have a set of rules and alerts designed to monitor the health status of a web application. In this context, the management pack can remotely test a web application periodically to make sure that the application is running and available, and ensure that a web server that hosts the application is running properly and is not in an error state (e.g., the web server has not crashed).

By interacting with the operations management system through operations management interface 120, the user can set up system monitors, address system errors or other problems, configure system components, and view system characteristics (e.g., the memory state of a specific system component).

Illustrative User Interfaces

FIGS. 2-5 illustrate illustrative operations management tool graphical user interfaces. These interfaces are presented for purposes of example only, and the discussed processes and techniques may utilize a variety of different user interface configurations.

Figure 2:
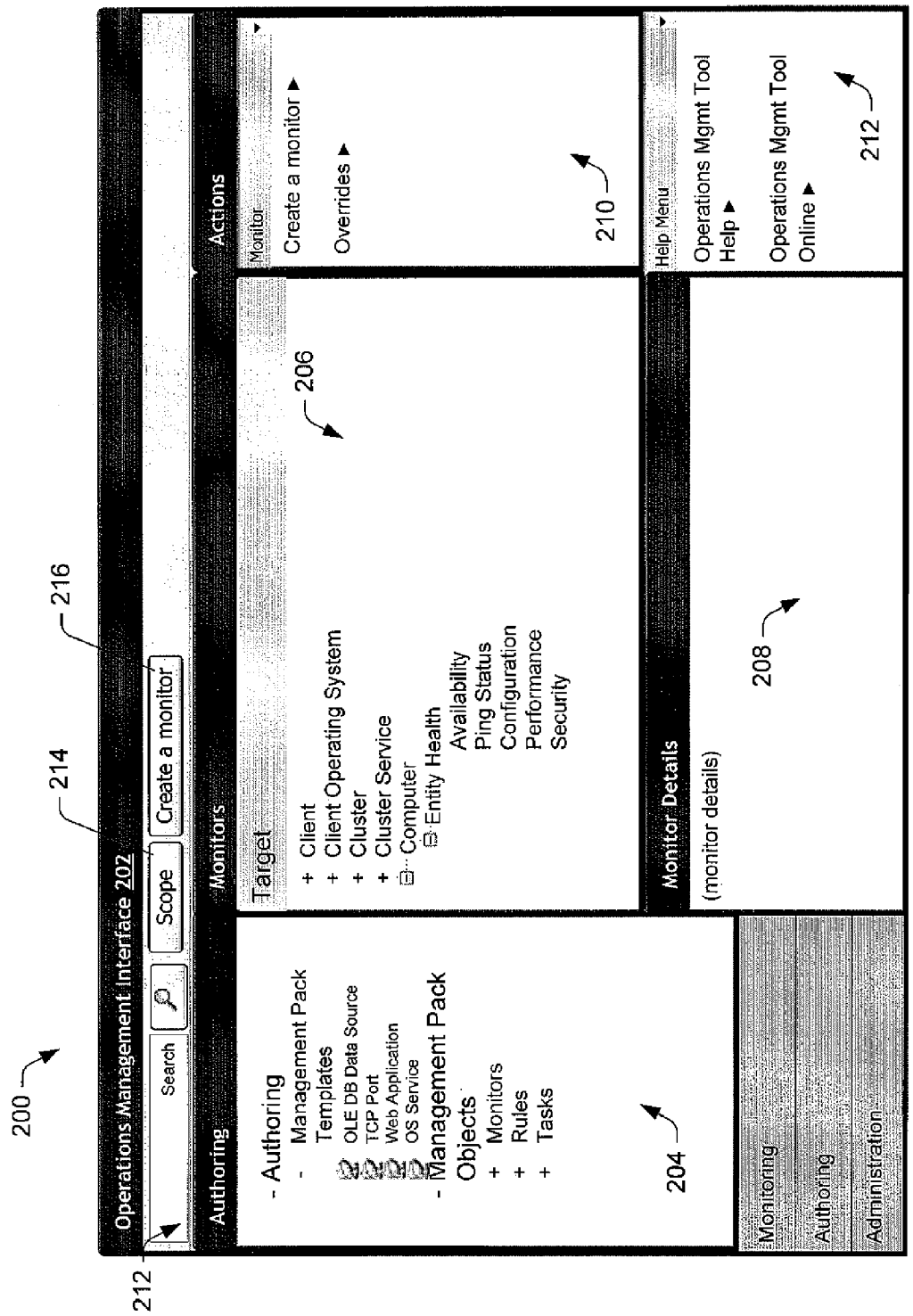
FIG. 2 illustrates an illustrative operations management user interface.

FIG. 2 illustrates, at 200, an illustrative operations management interface 202 that allows a user to accomplish a variety of operations management tasks within a system. In operation, a user chooses a particular view using navigation pane 204. In the illustrated example, navigation pane 204 provides the options of performing monitoring, authoring, and administration by selecting the corresponding "monitoring", "authoring", or "administration" button from the navigation pane to activate the particular "workspace". By utilizing the monitoring workspace of the operations management tool, a user can track system status and health data over a variety of different system parameters. The authoring workspace allows a user to describe the types of objects the user wants to monitor and create system management groups, attributes, monitors, tasks and rules. The administration workspace allows a user to configure device management, global settings, roles and authorizations, and e-mail or cellular notifications. Device management includes configuring client monitoring, assigning devices to system management groups, and configuring device proxy settings, among others. Configuring global settings includes setting up authorization roles and deciding how long information is to be stored in a database associated with the management system. In this example, the header of navigation pane 204 indicates that the operations management tool is currently implementing the authoring functionality. Workspaces are displayed to users only if they have been granted permission to use that workspace by a user role. For example, a user who has been added to a user role based on the Operator user role profile will only see the Monitoring, Reporting, and My Workspace workspaces and will not be able to see/use the Authoring or Administration workspace. This reduces the amount of data pre-sented to the user making it easier for the user to focus on the tasks most relevant to his role.

Results pane 206 displays one or more fields associated with the current view and displays the results of any searches or queries performed within the operations management tool. As shown in the header of results pane 206, the results pane is currently displaying some of the monitors that are available in this operations management tool. In this example, results pane 206 displays multiple targets that a user wishes to observe (monitor) or configure. These targets include multiple system types, such as a client, a client operation system (OS), a system cluster, and the like. In this example, the type "computer" has been expanded, and multiple type health aspects are available to be monitored. As shown, these health aspects include entity availability, configuration, performance and security.

Details pane 208 displays properties associated with a highlighted item in the results pane. For example, if the "availability" monitor for a particular device was selected in the results field, details pane 208 would display one or more details about this monitor as well as associated knowledge.

Actions pane 210 allows a user to select from several available tasks that can be executed on the operations management tool. In this example, the user is presented with the options of creating a monitor and/or overriding a monitor or other system management setting. Actions pane 210 can also include a help menu 212 with several available help topics that are relevant to the current tasks being performed, such as the ability to access an operations management help utility, or access an online resource associated with the operations management tool.

Operations management interface 202 includes a search tool 212 that allows a user to search the operations management tool and its associated databases. Search tool 212 can also search remote resources, such as the Internet. The search tool can be utilized to search for particular management packs, monitors, instances, and the like.

As part of the operations management interface, a scope button 214 allows the user to tailor the interface to the user's particular task, needs within the task, and/or preferences. The scoping functionality of the operations management tool is discussed in more detail below. Also included in the interface is a monitor button 216. When actuated, monitor button 216 launches a wizard interface that allows a user to create a monitor. As used herein, a monitor may include a module or other entity that observes system components and/or indicators, applies a set of monitoring rules to the indicators, and based on the results, invokes an action. Examples of actions include, without limitation, generating and forwarding alerts to the operations management server or other entities and performing specific procedures (e.g., a memory backup) in response to an indicator. The monitor wizard interface presents to a user a variety of system components and rules that can be used to monitor the components.

Figure 3:
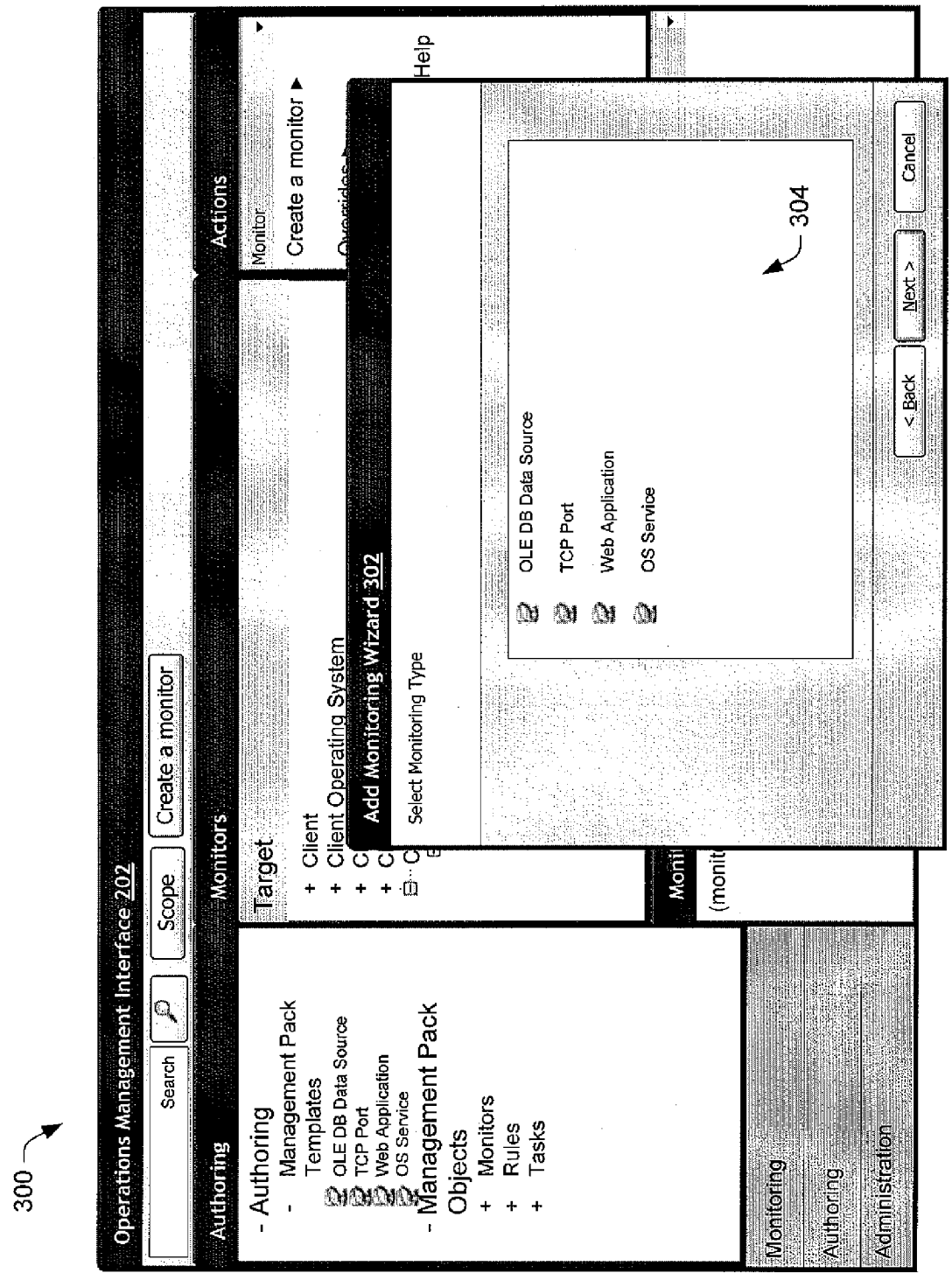
FIG. 3 illustrates an illustrative wizard interface for adding monitoring to a management pack.

FIG. 3 illustrates, at 300, an illustrative monitoring wizard 302 that assists a user in adding monitoring to a management pack. Monitors can be added at multiple system levels by targeting at any type, such as, for example, the Computer type, the Database type, or the Disk Drive type. For discussion purposes, monitoring wizard 302 is discussed with reference to operations management interface 202. When adding a monitor with monitoring wizard 302, the monitoring wizard presents the user with a set of management pack templates, as shown in template window 304. Each management pack template includes a set of rules and actions based on a specific object, type, group, or other system aspect or component. Using a management pack template, a user can create a custom management pack for a particular use or environment. When a user adds monitoring by creating a management pack for a new type of object with monitoring wizard 302, any standard attributes, monitors, diagnostic and recovery tasks, object discoveries, rules, tasks, and views necessary to monitor the object are automatically inherited from the base type of the new type (i.e., the new type created from the base type in the management pack template. In some implementations, the templates may be modified and/or supplemented to include additional attributes, monitors, diagnostic and recovery tasks, object discoveries, rules, tasks, views, and the like. The management pack templates shown here are for purposes of example only, and any number and type of management pack templates may be used. For sake of clarity, the management pack templates illustrated in FIG. 3 will be briefly described:

Object Linking and Embedding (OLE) Database (DB) Source—This template configures monitors and transactions that monitor the availability of databases.

Transmission Control Protocol (TCP) Port—This template configures transactions and monitors that monitor the availability of system services.

Web Application—This template configures transactions and monitors that verify the availability of Web-based applications.

Operating System (OS) Service—This template configures monitors and rules that verify the availability of an operating system service.

As described, a management pack template enables a derived type (i.e., a new type) to be created using predefined monitors and rules from the base type defined in the management pack template. In one illustration, a user wants to monitor an operating system service for a particular system application. The user can select the "OS Service" management pack template from a collection of management pack templates (e.g., from add monitoring wizard 302) and specify the name of the operating system service that the user wants to monitor. The operations management tool then creates a new type that is derived from the OS Service type and a discovery rule that will automatically discover instances of the new operating system service. The monitors and rules that are part of the OS Service base type are inherited by the new operating system service type. The customer can then customize the new service using monitors and/or rules that are specific to how the customer wants to manage the new operating system service.

Figure 4:
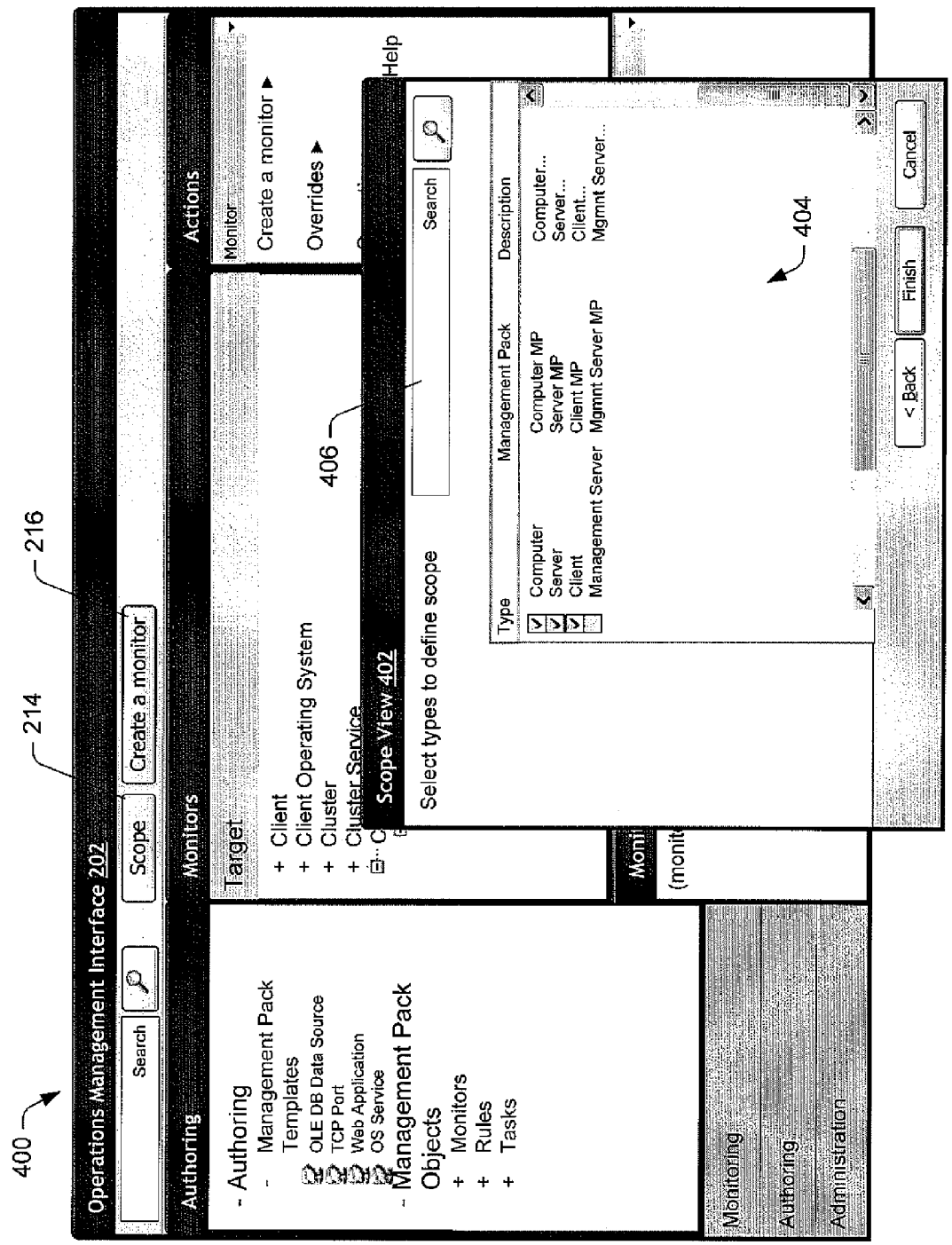
FIG. 4 illustrates an illustrative scoping interface for scoping an operations management interface.

FIG. 4 illustrates at 400 an illustrative scoping interface 402. For discussion purposes, scoping interface 402 is discussed with reference to operations management interface 202. As discussed above, scoping interface 402 can be launched by actuating scoping button 214. Of course, scoping may additionally or alternatively be initiated by any other suitable button, drop-down menu, keystroke, or other user interface feature. Scoping allows a user to tailor the operations management interface 202 and/or the overall user experience by displaying the system information that is relevant to the particular user and the user's task and excluding other information. Scoping can be performed based on the user's role in the system and/or based on the task(s) that a user wishes to perform. For example, when a user is performing monitoring with the operations management tool, the operations management interface can be scoped based on available groups and types. In other words, the user can select one or more groups and types to include and exclude in a particular monitoring session. When a user is performing authoring, the operations management interface can be scope management pack components such as attributes, monitors, rules, tasks, and views based on the types they are associated to. Scoping can also be done based on user permissions within the operations management system, among other things. When a user logs on to the operations management system, the information available to the user (e.g., types, objects, actions, rules, and the like) can be automatically scoped by the operations management tool based on the user's permissions. Each role, task, and/or permission that a user has within the operations management system can be associated with a specific scoping interface with specific types, objects, groups, rules, and the like. Additionally or alternatively, the information available to the user may be manually scoped using the scoping button 214. Thus, a user is scoped by the user's role as defined by a system administrator or other entity with the permissions necessary to define user roles. Scoping by user role serves as a security measure that prevents unauthorized access to system resources and/or functions. The user may then scope his or her operations management view within the user's respective permissions. This enables the user to tailor the operations management interface to the user's particular needs.

Scoping button 214 may be configured with a "sticky" behavior, in that when a scoping interface is launched using the button, the button will stay depressed on the interface and the scoping parameters chosen by the user will persist during future utilizations of the operations manager interface and the scoping interface. The scoping information can be cleared by deselecting the scoping button to de-actuate the scoping. This will clear any scoping preferences.

In one illustrative scoping interface 402, the user is given the choice of multiple types to scope the operations management interface with. The types may be derived from a selected management pack template from navigation pane 204. The listed types may also be associated with corresponding management packs (as illustrated, "MP") in scoping interface pane 404. Thus, the "computer" type is listed with a "computer" management pack, and so on. The user can select any number (or none) of the listed types. Only management pack objects related to the selected types will be displayed. In this example, the user has selected the computer, server, and client types, while the user has not selected the management server types. Thus, the management pack objects displayed to the user would be associated to me first three types, but not the fourth.

While not expressly illustrated here, a user can also scope by objects, groups of objects, or types of objects. As discussed above, an object is instance of a type of hardware, software, or any other entity in a system. An object can also be a group of individual objects. One implementation of a scoping interface allows the user to choose one or more objects to scope the data presented to the user. The scoping interface can be populated with individual objects, and a search interface 406 allows the user to search one or more associated systems for an object or group of objects to utilize in the scoping interface. A user can create a new group and populate the group with objects. In one example, when a user scopes to a particular object, including a group, the user is still able to see any instances, objects or entities contained by the object or group. Similarly, when a user scopes by a type, the user can see all the types that derive from that type.

In another example, the scoping interface can allow a user to select one or more events associated with a system. Examples of events include application failures, disk crashes, storage overloads, and the like. Events can also be defined by a user. A user can specify certain events, such as memory thresholds or power usage.

By utilizing scoping interface 402, a user can scope operations management data using multiple parameters. In one example, a user selects a type, object, or group in an inheritance tree, and by selecting a parent node of the inheritance tree, all inherited types, objects, or groups under the parent node will be automatically selected. A user can also view multiple types, objects, or groups grouped under specific management packs, and by selecting a management pack, all the types, objects, or groups under the management pack are automatically selected.

Figure 5:
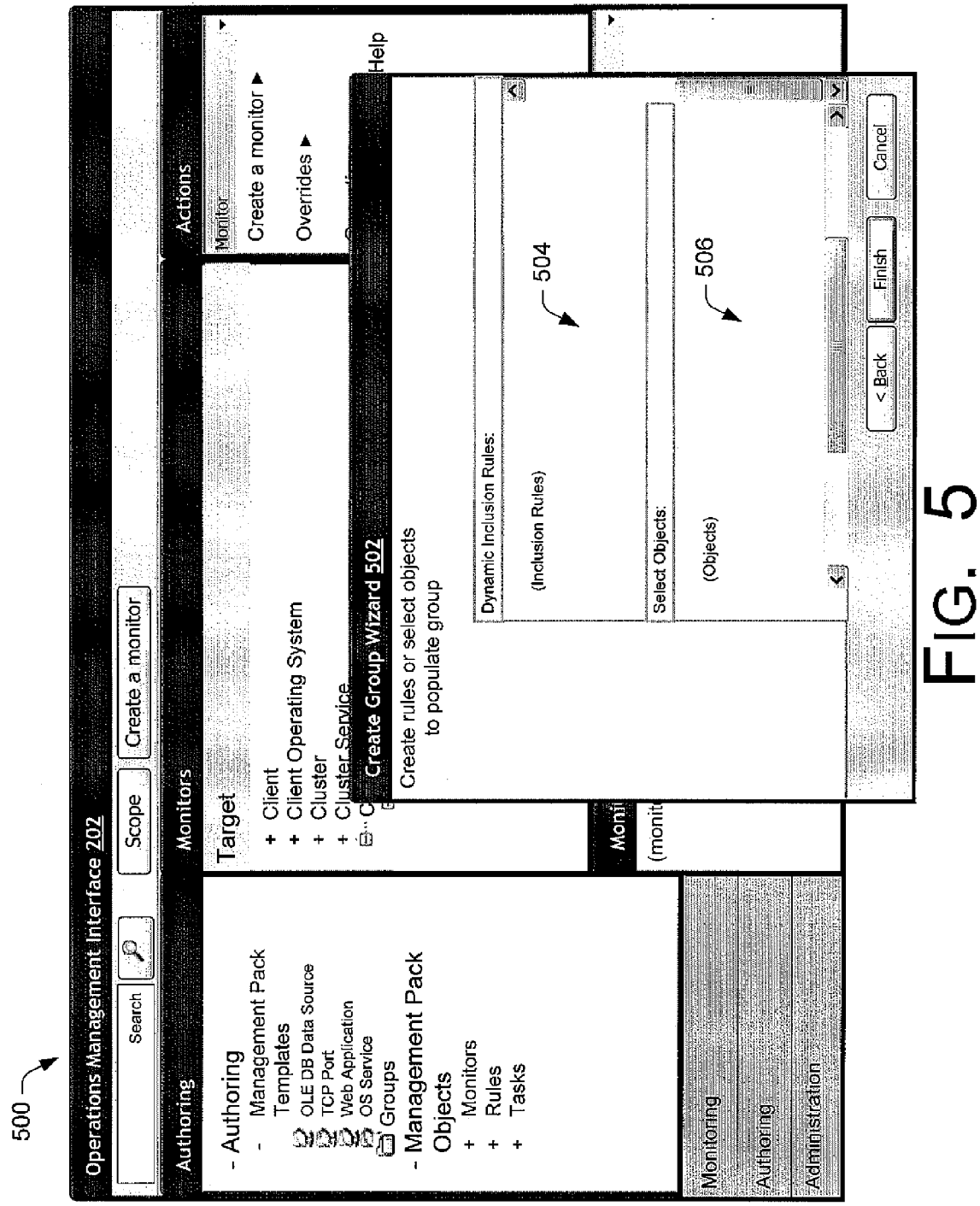
FIG. 5 illustrates an example of a wizard interface for creating management groups.

FIG. 5 illustrates at 500 an illustrative create group wizard interface 502 that enables a user to create one or more groups. Dynamic inclusion rules can be created in dynamic rules pane 504. Dynamic inclusion rules are discussed in greater detail above. Also shown is static rules pane 506, which enables a user to select objects to add to a group. In one example, static rules pane 506 lists objects and enables a user to select the objects to add to a group. Create group wizard interface 502 enables a user to create dynamic groups, static groups, and/or combinations of dynamic and static groups.

Illustrative Processes

Illustrative processes are described in this section with additional reference to FIGS. 1-5. While the processes are described in the context of the operations environment 100 shown above for convenience, the processes are broadly applicable to other systems and environments of networked components. The illustrative processes may be described in the general context of computer executable instructions and are illustrated as collections of blocks in logical flowcharts, which represent sequences of operations that can be implemented in hardware, software, or a combination thereof. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer storage media, including memory storage devices.

Figure 6:
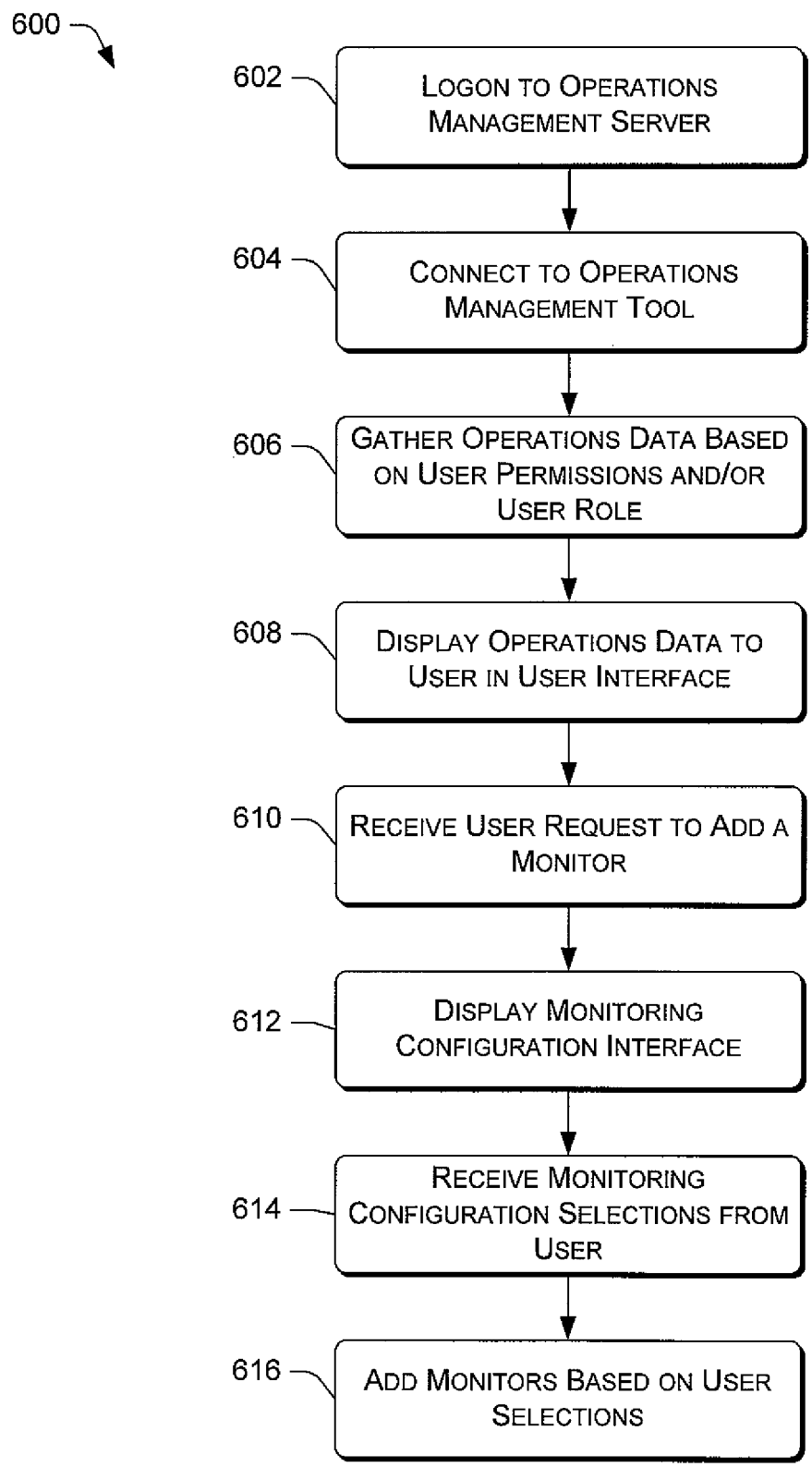
FIG. 6 is a flow diagram of an illustrative process for adding a system monitor using a management pack template.

FIG. 6 illustrates at 600 an illustrative process for creating a system monitor. At 602, a user logs in to an operations management system. Typically, as part of the logon process, the user will provide some indication of the user's role or function in the operations management system. For example, the user may log in to the system as an administrator, an author, and operator, etc. Alternatively and/or additionally, each user may have a customized login profile that defines the user's function within the operations management system.

At 604, the user connects to the operations management tool from the operations management server. This can be done using a device such as operation console 104. At 606, the operations management server gathers user role data based on the login information provided by the user. The user role data can be stored on the operations management server and may also be stored on a remote resource such as a database that is accessible to the operations management server. The user role data can include information such as user identification data, user role data, and permissions associated with the user. The permissions define the system resources that the user is permitted to access and the actions within the system that the user is permitted to commit (e.g., monitoring, authoring, and the like). As part of gathering the user role data, the operations management server gathers system resource data based on the user permissions and/or user's role.

At 608, the gathered system data is displayed to the user in an interface (e.g., operations management interface 202). In one implementation, the user interface presents tasks and/or actions to the user based on the permissions associated with the user. At 610, the user submits a request to the operations management tool to add a monitor. At 612, the operations management tool displays a monitoring configuration interface that allows the user to add the monitor. At 614, the operations management tool receives the user's monitoring configuration selections and, at 616, the tool adds or generates a monitor based on the selections. As part of creating the monitor, the monitor can be implemented in the operations management system.

Figure 7:
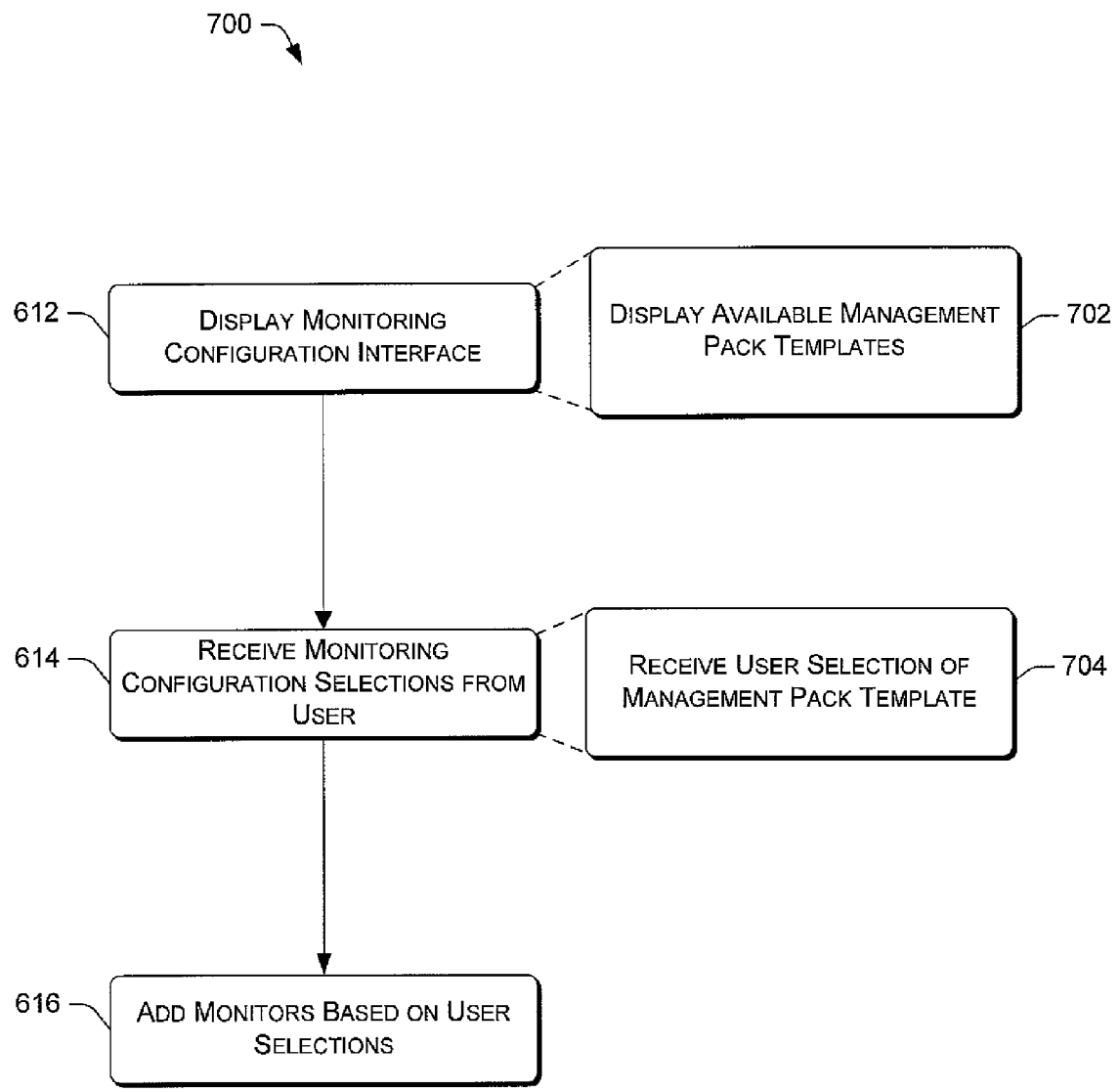
FIG. 7 is a flow diagram that details illustrative aspects of a system monitor implementation process.

FIG. 7 illustrates at 700 several aspects of process 600 in more detail. As part of act 612, the operations management tool may display, at 702, an available selection of management pack templates to the user. As part of act 614, the operations management tool receives, at 704, the user's selection of a management pack template. At 616, the operations management tool adds a monitor based on the user's management pack template and any scoping selections. Other aspects of the management pack templates are discussed above with respect to FIG. 3.

Figure 8:
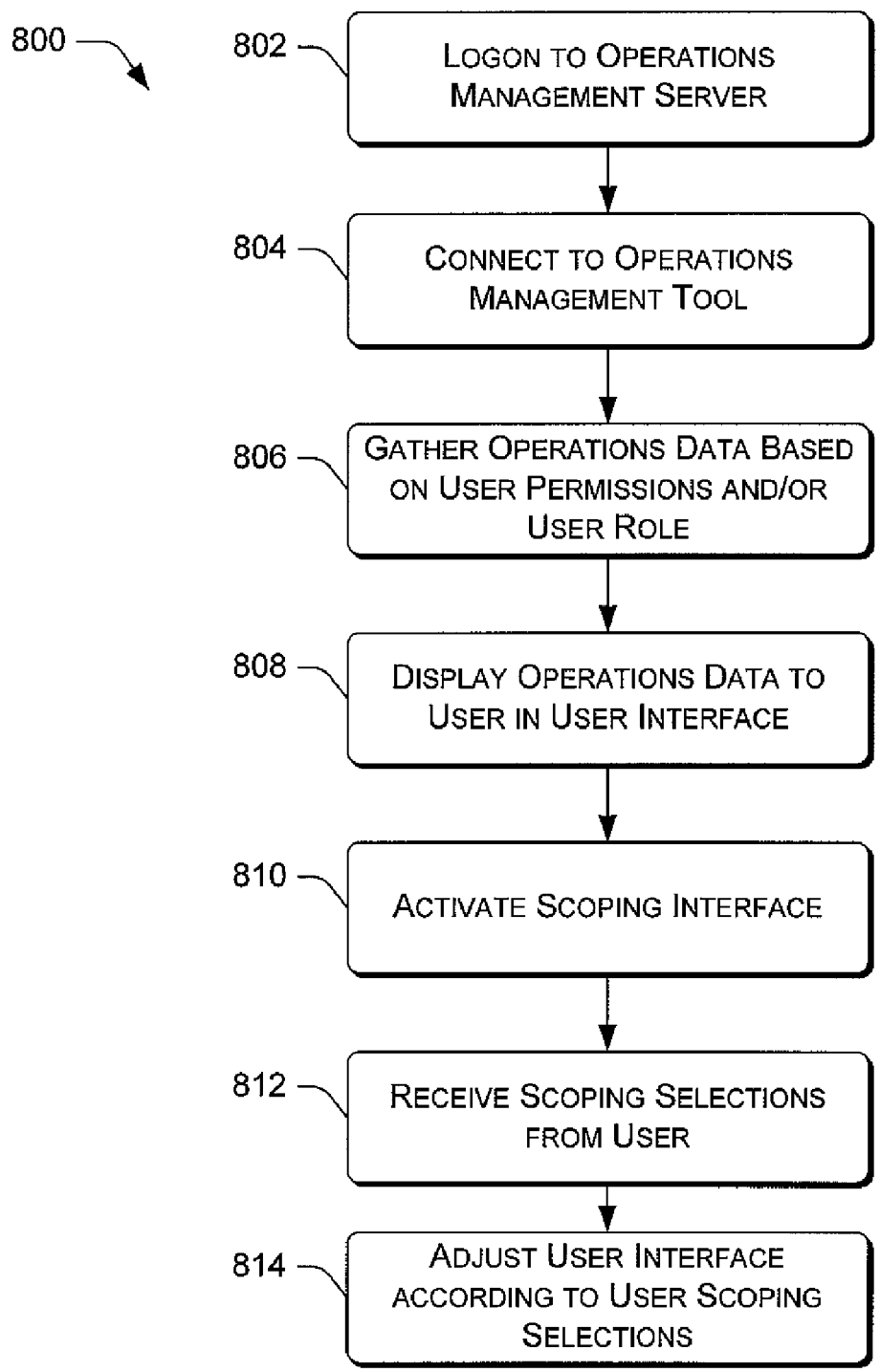
FIG. 8 is a flow diagram of an illustrative process for scoping an operations management interface.

FIG. 8 illustrates at 800 a process for tailoring an operations management interface for a particular user. At 802, a user logs on to the operations management server. At 804, the user connects to the operations management tool. At 806, the operations management tool gathers user profile data and system resource data. As discussed above, the gathered data may be based on the user's role in the operations management system, as well as the system permissions associated with the user. At 808, the operations management tool displays the gathered system data to the user. At 810, the user activates a scoping interface associated with the operations management tool and the interface is displayed to the user. At 812, the operations management tool receives the user's scoping selections, if any. At 814, the operations management tool adjusts the operations management interface according the user's scoping selections. This may include, for example, displaying only the groups, objects, and types chosen by the user and excluding those not chosen by the user. This allows the user to simplify the interface by displaying those system components that the user needs or wants to see in order to accomplish the user's particular task.

Figure 9A:
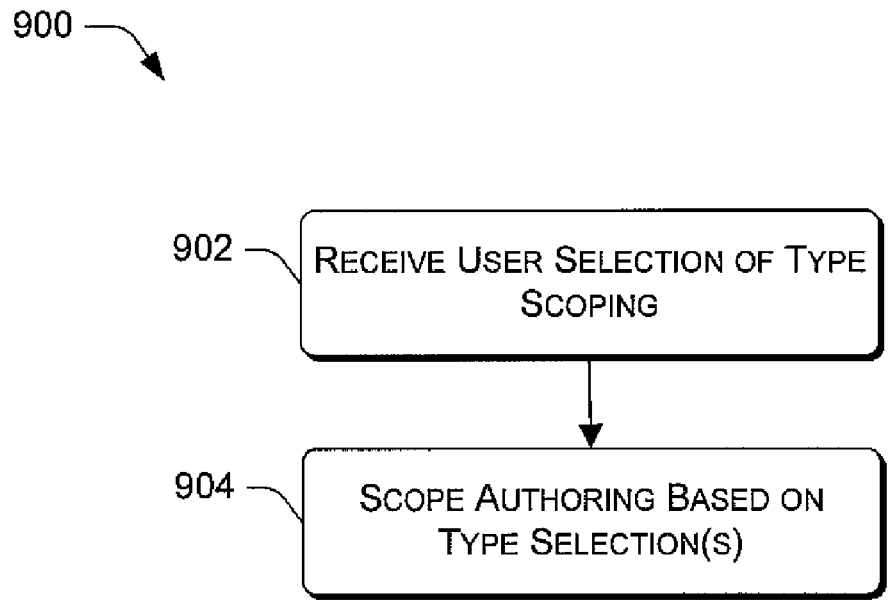
FIG. 9A is a flow diagram of an illustrative process for scoping an authoring workspace based on type selection.

FIG. 9A illustrates, at 900, an illustrative process for scoping authoring based on type selection(s). Process 900 may be implemented in combination with, or separately from, the earlier discussed processes. At 902, the operations management tool receives the user's scoping selections based on one or more types. At 904, the operations management tool scopes the authoring interface based on the user's selections.

Figure 9B:
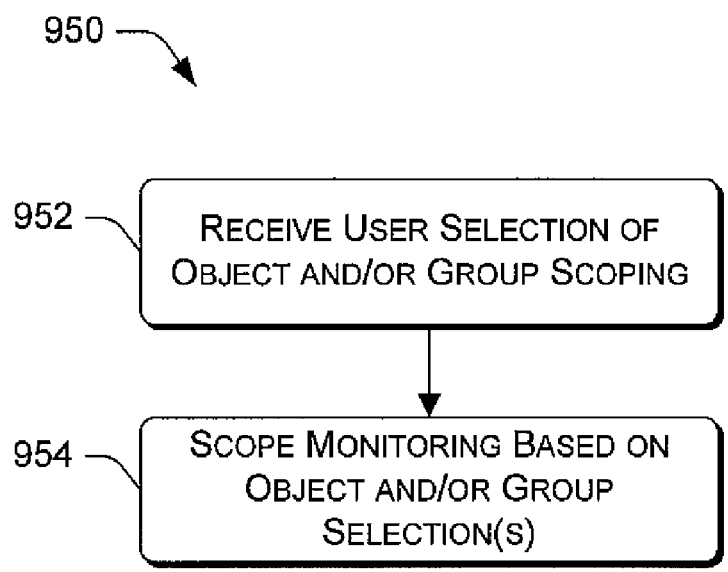
FIG. 9B is a flow diagram of an illustrative process for scoping a monitoring space based on group/object selection.

FIG. 9B illustrates, at 950, an illustrative process for scoping monitoring based on object and/or group selections. At 952, the operations management tool receives the user's scoping selections based on one or more objects and/or groups. At 954, the operations management tool scopes the monitoring interface based on the user's object and/or group selections.

With respect to the processes discussed above, the operations management tool may also display an information bar in an operations management interface that displays the selected scope in terms of included and excluded types, objects, rules, and the like.

Agents

In managing system components, the operations management tool may utilize an entity known as an agent. An agent is a software component that runs on a system resource (e.g., a system client device) that a user wishes to manage with the operations management tool. The agent can interact with the tool and with any monitors created by a user. The agent observes system component resources, such as event logs, for specific events or alerts generated by the component and applications running on the component. The agent can send notifications to the operations management tool and thereby generate alerts on an operations management interface. These alerts allow a user of the operations management tool to detect problems with system components and generally be cognizant of the overall health of system components.

While various illustrative device and operating implementations have been described, the components, modules, and features of these implementations may be rearranged, modified, and/or may be omitted entirely, depending on the circumstances.

Also, it should be understood that certain acts in the methods need not be performed in the order described, may be rearranged, modified, and/or may be omitted entirely, depending on the circumstances.

Moreover, any of the acts described above with respect to any method may be implemented by a processor or other computing device based on instructions stored on one or more computer-readable media. Computer-readable media can be any available media that can be accessed locally or remotely by the resource modeling application. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the resource modeling application. Combinations of the any of the above should also be included within the scope of computer-readable media.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention.

What is claimed is:

1. A method comprising:
    obtaining information about a system comprising one or more hardware components, software components, or both hardware and software components;
    determining a set of permissions associated with a user's role with respect to an operations management system; and
    presenting at least a portion of the obtained information to the user, the portion of the obtained information presented to the user being based on the permissions associated with the user.

2. A method as recited in claim 1, wherein the obtained information presented to the user is based on one or more models.

3. A method as recited in claim 1, wherein the set of permissions associated with the user are determined at least in part by the user's role in the system.

4. A method as recited in claim 1, further comprising displaying an interface to the user that allows the user to scope the obtained information that is presented to the user based on one or more types, a type comprising a class of system components.

5. A method as recited in claim 1, further comprising displaying an interface to the user that allows the user to scope the obtained information that is presented to the user based on one or more objects, an object comprising an instance of a system component.

6. A method as recited in claim 1, wherein the obtained information comprises one or more tasks, actions, or help links to the user based on the permissions associated with the user.

7. A method as recited in claim 1, wherein the portion of the obtained information presented to the user is further based upon a workspace that the user has activated.

8. One or more computer-readable media comprising computer executable instructions that, when executed, perform acts comprising:
    ascertaining a role of a user in an operations management system;
    defining one or more types that the user has permission to view;
    gathering data about one or more components of the operations management system based on the role of the user and the types that the user has permission to view; and
    presenting at least a portion of the data to the user.

9. One or more computer-readable media as recited in claim 8, wherein the data presented to the user comprises one or more rules templates.

10. One or more computer-readable media as recited in claim 8, wherein the operations management system comprises one or more hardware components, software components, or both hardware and software components.

11. One or more computer-readable media as recited in claim 8, further comprising presenting one or more tasks, actions, or help links to the user based on the user's role in the operations management system.

12. One or more computer-readable media as recited in claim 8, further comprising displaying an interface to the user that allows the user to scope the data that is presented to the user based on one or more types.

13. One or more computer-readable media as recited in claim 8, further comprising displaying an interface to the user that allows the user to scope the data that is presented to the user based on one or more objects.

14. One or more computer-readable media as recited in claim 8, further comprising:
    presenting one or more rules templates to a user;
    receiving a selection of a rules template from the user; and
    generating a monitor based on the selected rules template.

15. A method of generating a monitor comprising:
    prompting a user to select a rules template from a selection of one or more rules templates in an operations management system;
    loading the selected rules template; and
    presenting an interface having fields tailored to the selected rules template.

16. A method as recited in claim 15, wherein each rules template comprises a set of rules for observing one or more components of the operations management system.

17. A method as recited in claim 15, wherein the fields comprise one or more groups, one or more objects, or one or more groups and objects.

18. A method as recited in claim 15, wherein the fields comprise one or more events.

19. A method as recited in claim 15, further comprising:

receiving from the user a selection of one or more of the fields; and scoping the monitor based on the user selection.

20. A method as recited in claim 15, further comprising implementing the monitor to monitor one or more system components.

* * * * *